April 28, 1931.  E. ZINDEL  1,802,692

LANDING CARRIAGE FOR AIRCRAFT

Filed June 9, 1928   2 Sheets-Sheet 1

Inventor:
Ernst Zindel
by [signature] Atty

April 28, 1931. E. ZINDEL 1,802,692
LANDING CARRIAGE FOR AIRCRAFT
Filed June 9, 1928  2 Sheets-Sheet 2
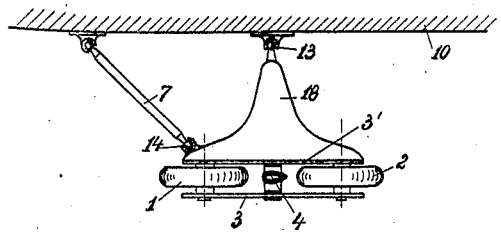
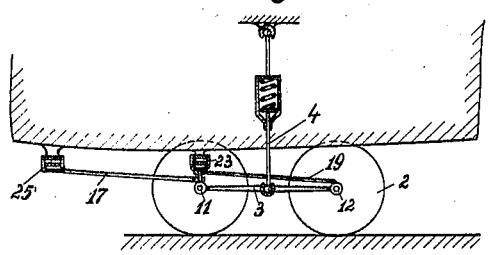
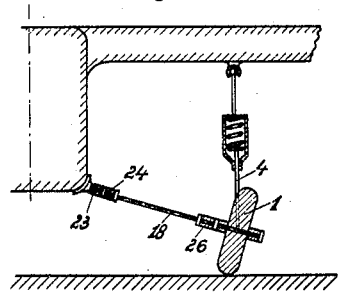
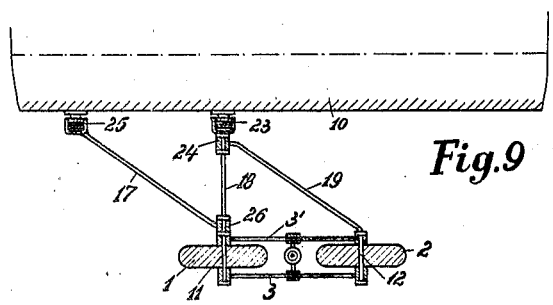
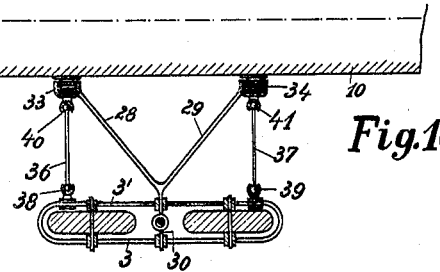
Inventor:
Ernst Zindel
by [signature]
Atty.

Patented Apr. 28, 1931

1,802,692

UNITED STATES PATENT OFFICE

ERNST ZINDEL, OF DESSAU, GERMANY, ASSIGNOR TO HUGO JUNKERS, OF DESSAU, GERMANY

LANDING CARRIAGE FOR AIRCRAFT

Application filed June 9, 1928, Serial No. 284,058, and in Germany February 17, 1928.

My invention refers to the landing carriages for aircraft and more particularly of flying machines and has for its particular object to provide means whereby such landing gear is rendered more efficient than was hitherto possible.

Hitherto flying machines which are designed to land on solid ground are as a rule supported on the ground by means of two wheels arranged laterally of the longitudinal middle axis of the craft, the wheel axle extending transversely to this middle axis and substantially perpendicular below the centre of gravity of the craft. The tail end of the craft is as a rule supported by means of a spike. It has already been suggested to provide such landing carriages with two wheels arranged in series and connected by a balance beam which takes up the load of the craft, the two wheels being thus always evenly loaded independently of the formation of the ground.

The present invention consists in an improvement of this balance beam arrangement and its particular object is to render landing carriages of the balance beam type more resistive against laterally acting shocks.

Hitherto these shocks were taken up by struts extending from the middle of the balance beam in horizontal or oblique direction to fixed points of the craft. If only one of the wheels is met by a lateral shock, the balance beam and the bracing strut are subjected to severe bending stresses and suffer deformation, in consequence of which the craft, instead of rolling in a straight line, will move in a serpentine, whereby the security of starting and landing is greatly impaired.

I obviate these drawbacks according to the present invention by bracing each half of the landing carriage, composed of two wheels arranged in series and of the balance beam connecting same, against lateral shocks by means of struts which are secured to the balance beam near its outer ends and preferably to the wheel axles, so that lateral shocks acting on one or the other wheel are not capable of subjecting the beam or frame and the struts to bending or torsional stresses. In order to enable these lateral struts to take up and transmit to the body of the craft also frontal shocks, I prefer arranging the struts after the manner of an N or in such manner that they form a kind of disc to which the balance beam is connected in some suitable manner. The vertical shocks and the load of the craft are taken up as usual by vertically or obliquely extending struts of the resilient type which are connected to the middle of the balance beam. In order that each half of the carriage be enabled to give way to the resiliency of these vertical struts, I secure the horizontal struts or discs to the body of the craft in a manner whereby they are enabled to rock about substantially horizontally extending axes or about ball joints.

In the drawings affixed to this specification and forming part thereof several forms of a landing gear are illustrated diagrammatically by way of example.

In the drawings,

Fig. 1 is a side elevation and

Fig. 2 a front elevation if a flying machine with a landing carriage according to this invention applied to it.

Figure 5:
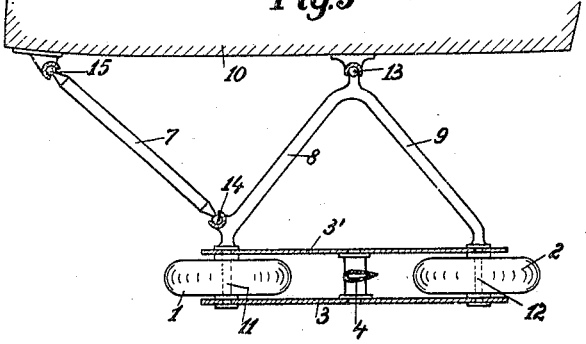

Fig. 5 a plan view of a landing carriage embodying my invention.

Fig. 6 is a plan view of another modification.

Figs. 7, 8 and 9 are a side elevation, front elevation and plan view, respectively, partly in section of another modification, and

Fig. 10 is a plan view, partly in section of still another form.

Figure 1:
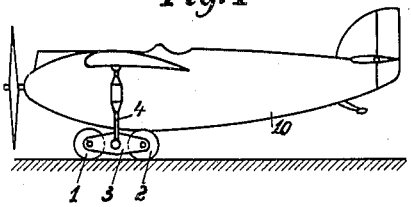
Figure 2:
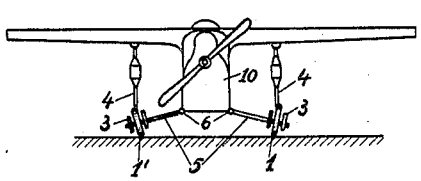

Referring first to Figs. 1 and 2 of the drawings, 1, 2 and 1', 2' are the two pairs of wheels, the wheels of each pair being arranged in series substantially in parallel to the longitudinal axis of the craft. The wheels of each pair are connected by a balance beam 3 acted upon in the middle by the well known resilient strut 4 which transmit the weight of the craft onto the beam and the two wheels. The pairs of wheels are guided laterally by means of struts 5 which extend substantially horizontally or at a small angle to the horizontal and are linked to the body of the craft at 6 in such manner that the balance beams are enabled to follow the variations in length of the struts 4 and can freely rock about their links.

Figure 3:
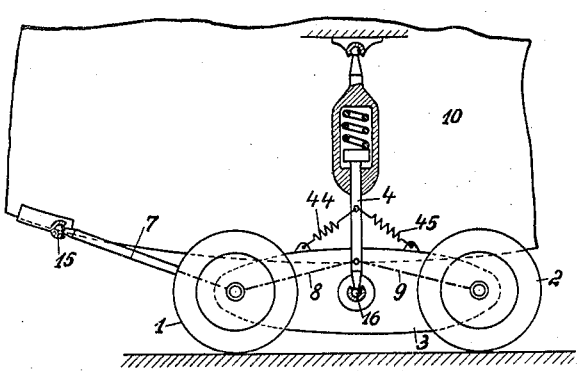
Fig. 3 is a side elevation partly in section.
Figure 4:
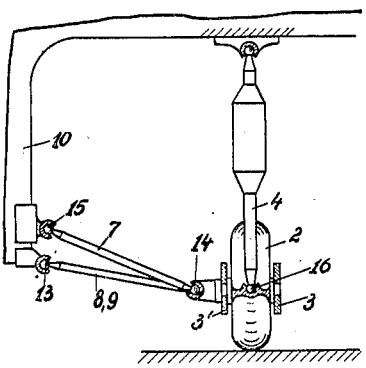
Fig. 4 is a front elevation, also partly in section.

As shown in Figs. 3–5, the balance beam may be formed of two plates 3, 3', one on each side of the wheels, the frame thus formed being arranged in position by three struts 7, 8, 9 which are arranged substantially in the form of an N (Fig. 5). The struts 8 and 9 are directly connected with the wheel axles 11, 12 and converge towards a ball joint 13 fixed to the fuselage 10. The strut 7 is pivoted by means of a ball joint 14 to the strut 8 near the wheel axle 11 and by a ball joint 15 to the fuselage 10. The resilient strut 4 is connected to the middle of the balance beam 3, 3' by means of a ball joint 16, whereby the two wheels are always uniformly loaded and the balance beam is capable of freely rocking in all directions relative to the strut 4. I thus obtain that the balance beam can freely follow all irregularities of the ground, while on the other hand it is not subjected to bending stresses by lateral shocks acting on the wheels, as such shocks are transmitted by the wheel axles direct onto the struts 7, 8, 9 and onto the fuselage 10.

Fig. 6 illustrates a modification of this carriage, which is distinguished therefrom only thereby that the struts 8, 9 which form a rigid triangle together with the balance beam 3, 3', are replaced by a plate-shaped member 18 integral with the part 3' of the balance beam, this member 18 being linked to the hull by means of ball joint 13. In all other respects the arrangement and mode of action is the same as described with reference to Figs. 3–5.

In the examples thus far described the joint 13 is disposed in a different transversal plane relative to the craft as the joint 14 by the strut 7, and in consequence thereof the balance beam, whenever it is displaced from its horizontal middle position, will owing to the simultaneous rocking motion of the strut 7, be deviated in such manner that its middle line does no more extend in parallel to the longitudinal middle axis of the craft. I can avoid this for instance by arranging the parts as shown in Figs. 7–9, where the axle 11 of wheel 1 extends in a straight line in proximity to the fuselage 10, forming a strut 18 which is connected to the fuselage by means of a hinge joint 23. The axis 12 of wheel 2 extends towards the fuselage in the form of an angular strut 19, the end of which embraces the strut 18 near the joint 23 to form a hinge joint 24. The front strut 17 is connected with the fuselage by means of a hinge joint 25 arranged on the same level as the joint 23, its outer end embracing the strut 18 near the balance beam with a hinge joint 26.

With this arrangement of the parts the half of the landing carriage consisting of the parts 1, 2, 3, 3', on being subjected to vertical shocks, will rock about the horizontal axis extending through hinged parts 23, 25, and if the wheels 1 and 2 are resting on different levels, about the transversal axis extending through the links 24, 26. I thus avoid all deviation of the middle line of each half of the landing carriage from the position in parallel to the longitudinal middle axis of the craft.

In the modification illustrated in Fig. 10, two of the co-axial hinge joints 33, 34 are connected with the middle portion of the balance beam 3, 3' by braces 28, 29 united so as to end in a pin 30, about which the balance beam is arranged to rock, being at the same time capable of a slight axial displacement. Lateral shocks are transmitted by struts 36, 37, which are connected to the ends of the balance beam 3, 3' by ball joints 38, 39 and to the ends of the braces 28, 29 by ball joints 40, 41. In this device each half of the landing carriage is rocked by vertically acting shocks about the horizontal axis connecting the hinges 33, 34. If the two wheels are disposed at different levels, the rocking movement of the struts 36, 37 will cause a lateral displacement of the corresponding balance beam, however, if these struts are disposed symmetrically relative to the pin 30, this displacement will be the same for both struts and the balance beam will always remain in parallel to the longitudinal middle axis of the craft.

Obviously my invention is not limited to the modifications shown and described. Instead of a pressure-resistive strut 7 shown in Figs. 3–6, two struts may be provided which are merely subjected to tractive efforts and which are preferably arranged symmetrically to the vertical middle plane of the half of the carriage. The wheels together with the balance beam and if desired also the spring suspension means may be enveloped by stream-lined sheaths in order to reduce the air-resistance, and each half of the landing carriage can be provided with springs 44, 45 (Fig. 3) or other means of a well known kind for securing same in a predetermined position during flight.

More than two wheels may be arranged in each balance beam. An endless belt or chain may be placed on these wheels so as to obtain a kind of caterpillar arrangement, and if desired, the wheels may also be replaced by skids for starting and landing on snow and ice.

However, the balance beam itself may also serve as a skid.

I wish it to be understood that I do not desire to be limited to the exact details of construction shown and described for obvious modifications will occur to a person skilled in the art.

I claim:

1. Landing and starting gear for flying machines comprising a balance beam, a resilient support inserted between said beam and the craft to take up vertically active shocks and means inserted between the ends of said beam and two fixed points of the craft disposed in considerably spaced relation and pivoted to these latter points, said means being arranged to allow said beam to rock about two substantially horizontal axes, one of which extends substantially in the direction of flight through the said two points, the other at an angle thereto.

2. Landing and starting gear for flying machines comprising a balance beam, a resilient support inserted between said beam and the craft to take up vertically active shocks, and struts inserted between the ends of said beam and two fixed points of the craft disposed in considerably spaced relation and pivoted to these latter points, said struts being arranged to allow said beam to rock about two substantially horizontal axes, one of which extends substantially in the direction of flight through the said two points, the other at an angle thereto.

3. Landing and starting gear for flying machines comprising a balance beam, a resilient support inserted between said beam and the craft and struts inserted between the ends of said beam and the craft and pivoted to this latter, said struts being arranged to allow said beam to rock about two substantially horizontal axes, one of which extends substantially in the direction of flight, the other at an angle thereto, a free end and two jointed ends of said struts being connected with said craft and with said balance beam.

4. Landing and starting gear for flying machines comprising a balance beam, a resilient support inserted between said beam and the craft to take up vertically active shocks, and struts inserted between the ends of said beam and two fixed points of the craft disposed in considerably spaced relation and pivoted to these latter points, said struts being arranged to allow said beam to rock about two substantially horizontal axes, one of which extends substantially in the direction of flight through the said two points, the other at an angle thereto, and wheel axles forming extensions of said struts.

5. Landing and starting gear for flying machines comprising a balance beam, a resilient support inserted between said beam and the craft and three struts inserted between the ends of said beam and the craft and pivoted to this latter, said struts being arranged to allow said beam to rock about two substantially horizontal axes, one of which extends substantially in the direction of flight, the other at an angle thereto, wheel axles forming extensions of two struts and universal joints at both ends of the third strut.

6. Landing and starting gear for flying machines comprising a balance beam, a resilient support inserted between said beam and the craft, two struts coaxially hinged to the craft and extending in a substantially horizontal plane, a third strut hinged to one of the two other struts so as to be able to rock about this one strut together with said balance beam, said struts being arranged to allow said beam to rock about two substantially horizontal axes, one of which extends substantially in the direction of flight, the other at an angle thereto.

7. Landing and starting gear for flying machines comprising a balance beam, a resilient support inserted between said beam and the craft to take up vertically active shocks, a pin hinged to the craft and extending horizontally substantially at right angles to the craft, said beam being arranged to rock about said pin in a substantially vertical plane, and struts inserted between and pivoted to said beam and to fixed points on the craft disposed in considerably spaced relation to transmit frontally and laterally active shocks onto the craft, said struts being arranged to allow said beam to rock about two substantially horizontal axes, one of which extends substantially in the direction of flight, the other at an angle thereto.

8. Landing and starting gear for flying machines comprising a balance beam, a resilient support inserted between said beam and the craft and struts arranged substantially in N-form inserted between the ends of said beam and the craft and pivoted to this latter, said struts being arranged to allow said beam to rock about two substantially horizontal axes, one of which extends substantially in the direction of flight, the other at an angle thereto.

In testimony whereof I affix my signature.

ERNST ZINDEL.